(12) United States Patent
Eakin

(10) Patent No.: US 11,020,694 B1
(45) Date of Patent: Jun. 1, 2021

(54) MOBILE OIL FILTRATION SYSTEM AND METHOD OF USE

(71) Applicant: Christopher S. Eakin, Lindale, TX (US)

(72) Inventor: Christopher S. Eakin, Lindale, TX (US)

(*) Notice: Subject to any disclaimer, the term of this patent is extended or adjusted under 35 U.S.C. 154(b) by 127 days.

(21) Appl. No.: 16/436,527

(22) Filed: Jun. 10, 2019

Related U.S. Application Data

(63) Continuation-in-part of application No. 15/159,271, filed on May 19, 2016, now abandoned.

(60) Provisional application No. 62/163,536, filed on May 19, 2015.

(51) Int. Cl.
| | | |
|---|---|---|
| *B01D 29/96* | (2006.01) | |
| *B01D 27/08* | (2006.01) | |
| *B01D 29/56* | (2006.01) | |
| *B01D 27/14* | (2006.01) | |
| *B01D 29/00* | (2006.01) | |

(52) U.S. Cl.
CPC ............. *B01D 29/96* (2013.01); *B01D 27/08* (2013.01); *B01D 29/56* (2013.01); *B01D 27/146* (2013.01); *B01D 29/0052* (2013.01); *B01D 2201/043* (2013.01); *B01D 2201/0461* (2013.01); *B01D 2201/202* (2013.01); *B01D 2201/26* (2013.01); *B01D 2201/302* (2013.01); *B01D 2201/306* (2013.01); *B01D 2221/08* (2013.01)

(58) Field of Classification Search
None
See application file for complete search history.

(56) References Cited

U.S. PATENT DOCUMENTS

| | | | | |
|---|---|---|---|---|
| 4,591,434 A | * | 5/1986 | Prudhomme | ....... A47J 37/1223 210/117 |
| 5,417,851 A | * | 5/1995 | Yee | ......................... B01D 29/96 210/167.01 |
| 8,992,773 B2 | * | 3/2015 | Marheine | ............... B01D 35/26 210/167.28 |

* cited by examiner

*Primary Examiner* — David C Mellon
(74) *Attorney, Agent, or Firm* — Richard Eldredge; Leavitt Eldredge Law Firm

(57) ABSTRACT

A mobile oil filtration system includes a mobile oil reservoir having a plurality of wheels; a housing secured to the mobile oil reservoir; an input conduit secured to the housing; a pump in fluid communication with the input conduit; a spring-loaded filter downstream from and in fluid communication with the pump; a bag filter downstream from and in fluid communication with the spring-loaded filter; and an output conduit secured to the housing and in fluid communication with the bag filter.

1 Claim, 5 Drawing Sheets

MOBILE OIL FILTRATION SYSTEM AND METHOD OF USE

BACKGROUND

1. Field of the Invention

The present invention relates generally to filtration systems, and more specifically, to a mobile oil filtration system for cooking oil.

2. Description of Related Art

Filtration systems are well known in the art and are effective means to remove unwanted waste matter from the oil after use. For example, FIG. 1 depicts a conventional filtration system 101 having a storage tank 107 with a filter cartridge 109 disposed therein and configured to remove contaminates from the oil. During use, the person travels to the system 101 with a container 105 filed with the oil and pours the oil into the system 101, wherein the contaminates are removed via the filter cartridge 109, as indicated by an arrow.

One of the problems commonly associated with system 101 is the limited use. For example, the user 103 is required to transport the oil to the system 101, which could exhaust considerable time and effort. In some scenarios, the transportation process could be dangerous.

Another disadvantage is the limited types of filters currently being used. It should be understood that system 101 utilizes a specific type of filter 109 and is not adapted for use with other types of filters, e.g., a smaller sized filter 111.

Accordingly, although great strides have been made in the area of filtration, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
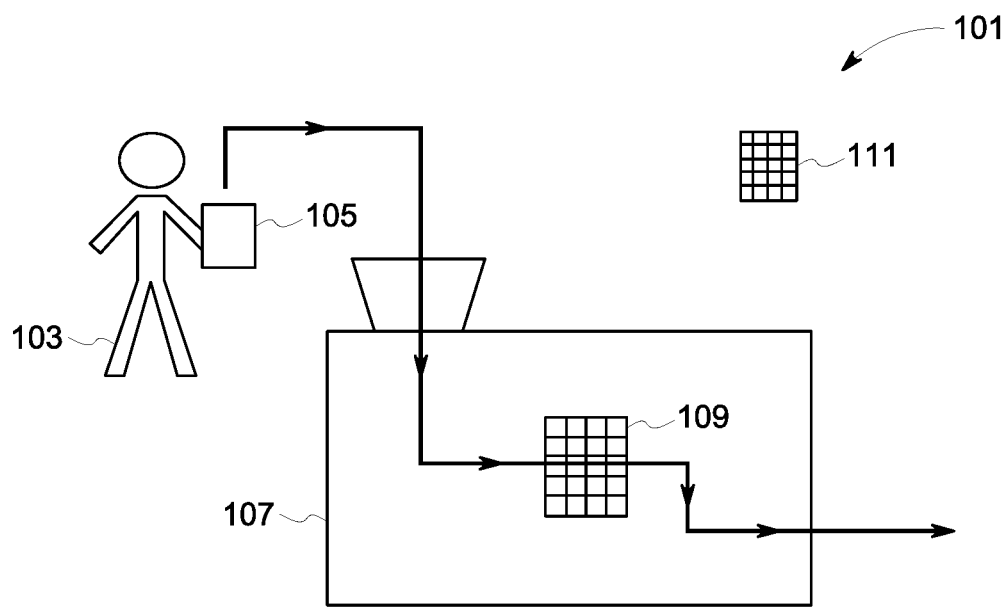
FIG. 1 is a simplified schematic of a common filtration system.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional filtration systems. Specifically, the system and method of the present application provides rapid and effective means to filter the oil through a multistage filtration system. In addition, the system is mobile, thereby allowing the user to bring the filter system to oil reservoir. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
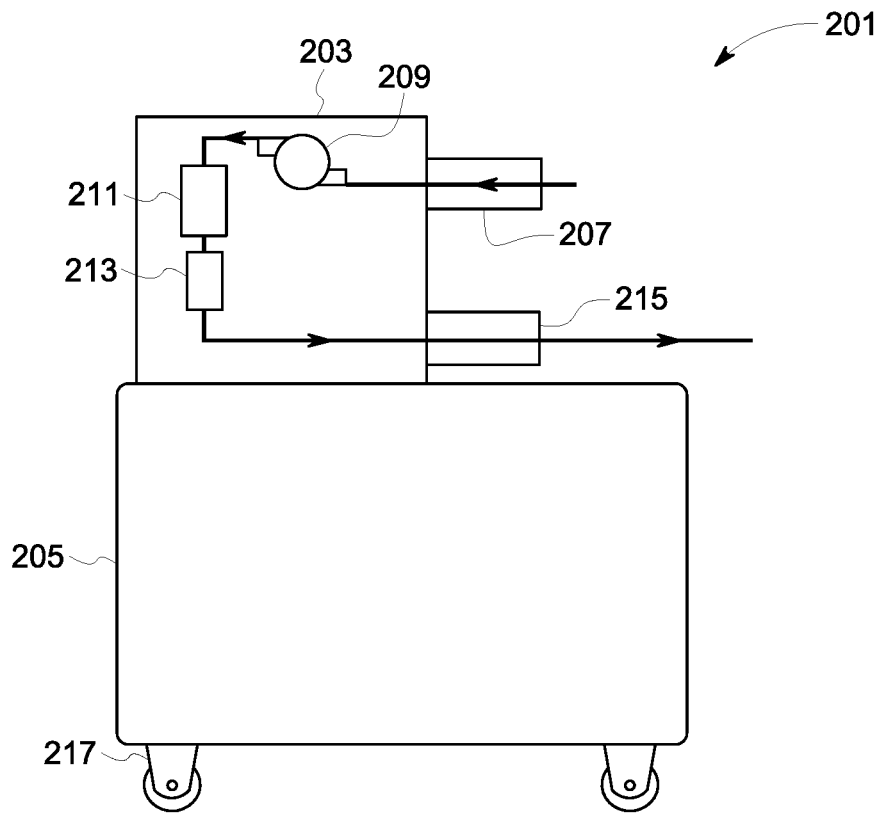
FIG. 2 is a simplified schematic of a mobile filtration system in accordance with a preferred embodiment of the present application.

Referring now to the drawings wherein like reference characters identify corresponding or similar elements throughout the several views, FIG. 2 depicts a simplified view of filtration system 201 and method of use in accordance with a preferred embodiment of the present application. It will be appreciated that system 201 overcomes one of more of the above-listed problems commonly associated with the conventional filtration systems.

In the contemplated embodiment, system 201 includes one or more of housing 203 rigidly attached to an oil reservoir 205. During use, the oil enters housing 203 via one or more conduits 207 and is channeled to a pump 209 carried within the housing 203. The fluid then passes through a first filter 211 and a second filter 213 traveling through one or more conduits before entering reservoir 205. After the filtration process, the oil carried within reservoir 205 exits through one or more exit conduits 215.

It should be appreciated that one of the unique features believed characteristic of the present application is the ability to transport system 201 to the place where the oil is located. To achieve this feature, system 201 is further provided with a plurality of wheels 217 attached to a bottom surface of reservoir 205.

Another unique feature believed characteristic of the present application is the use of multiple filters in lieu of one. Particularly, it is contemplated using a spring-loaded lid assembly for filter 211 and a bag filter 213, to aid in providing a seal for the filter bags. These types of filters allow easy and rapid changing of the filters after use. Further, these filters provide effective means to remove the waste material from the oil during use.

Although shown with a single cycle, as depicted in FIG. 2, it will be appreciated that the features discussed herein could easily be adapted for recirculation cycles, wherein the oil passes through the filters multiples passes.

Figure 3:
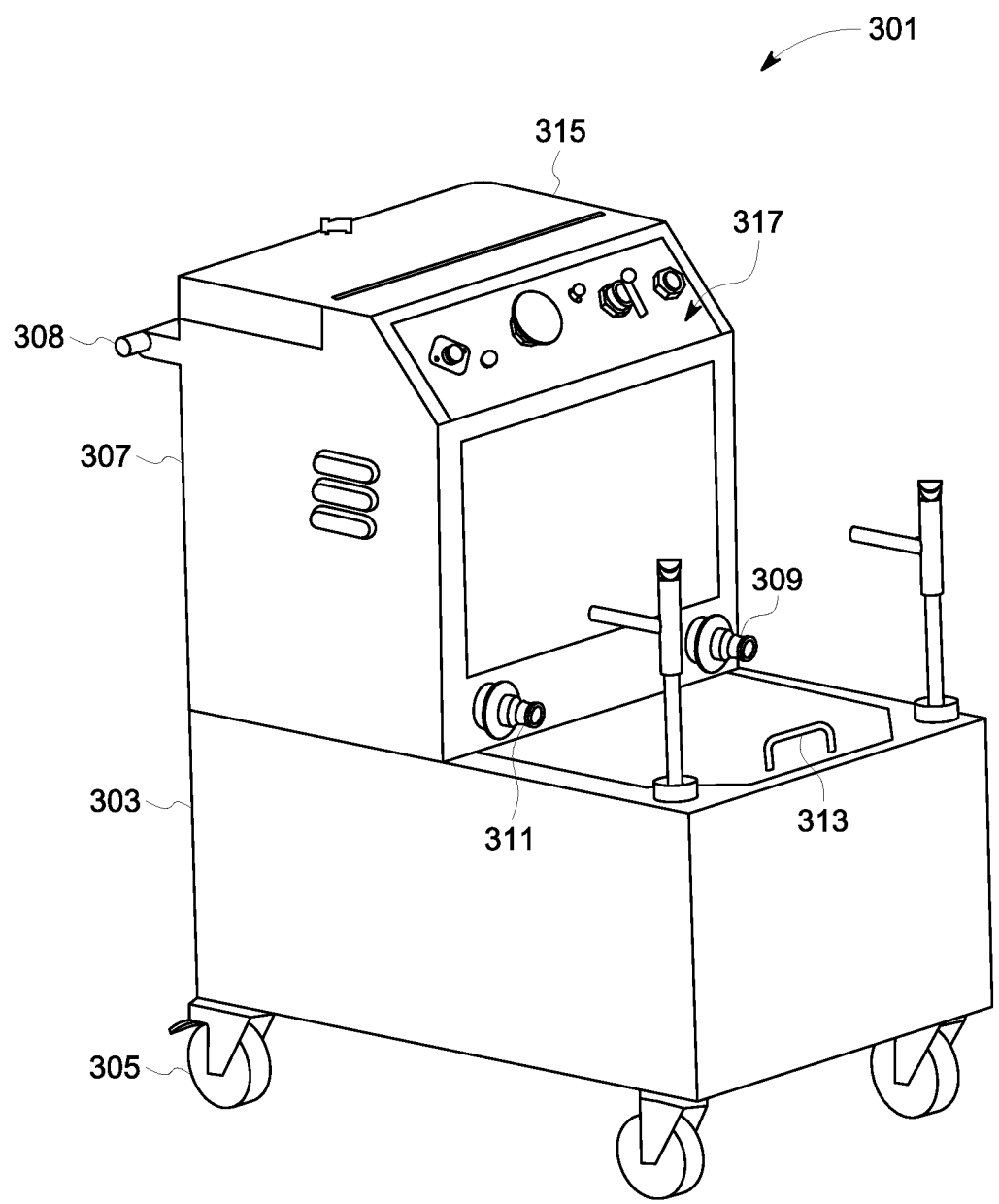
FIG. 3 is an isometric view of a mobile filtration system in accordance with an alternative embodiment of the present application.
Figure 4:
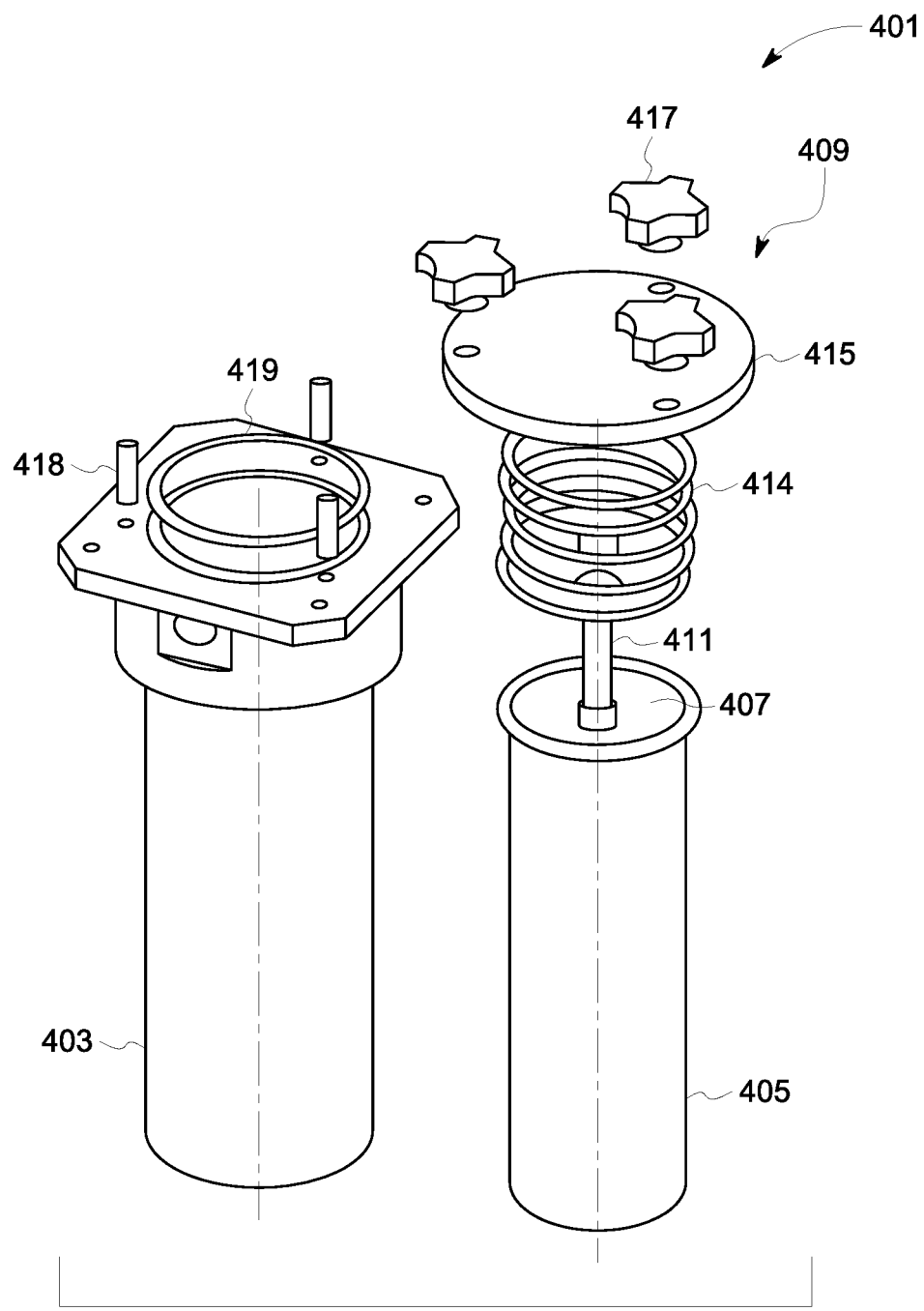
FIG. 4 is a disassembled view of a spring loaded filter in accordance with the present invention.
Figure 5:
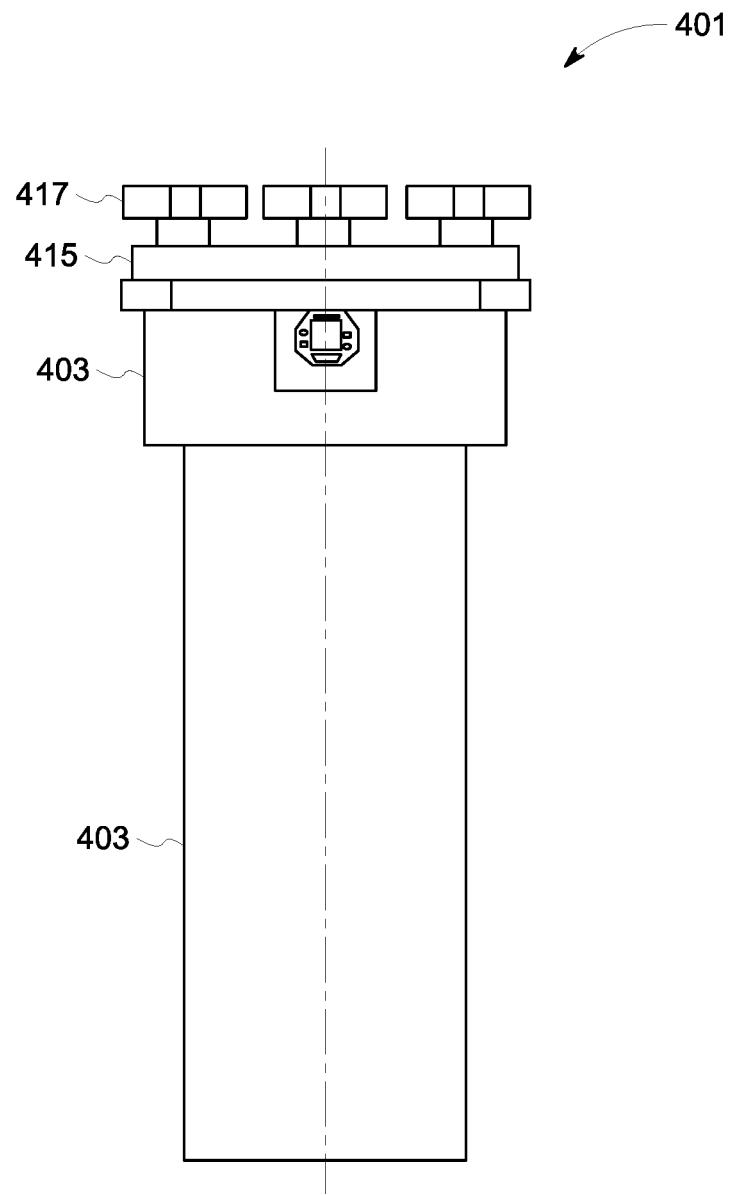
FIG. 5 is an assembled view of the filter of FIG. 4.
Figure 6:
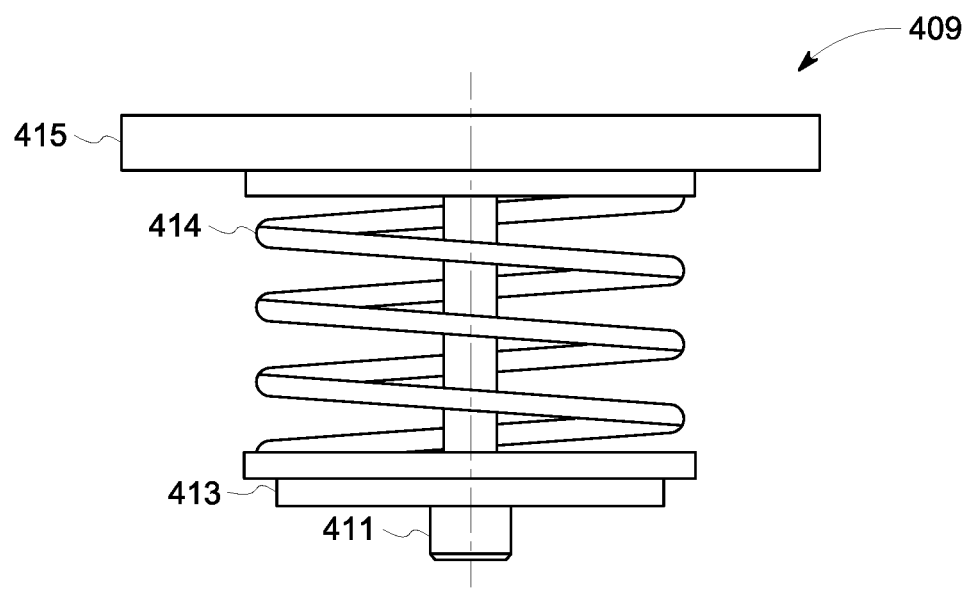
FIG. 6 is an assembled view of a spring assembly of the filter of FIG. 4.
Figure 7:
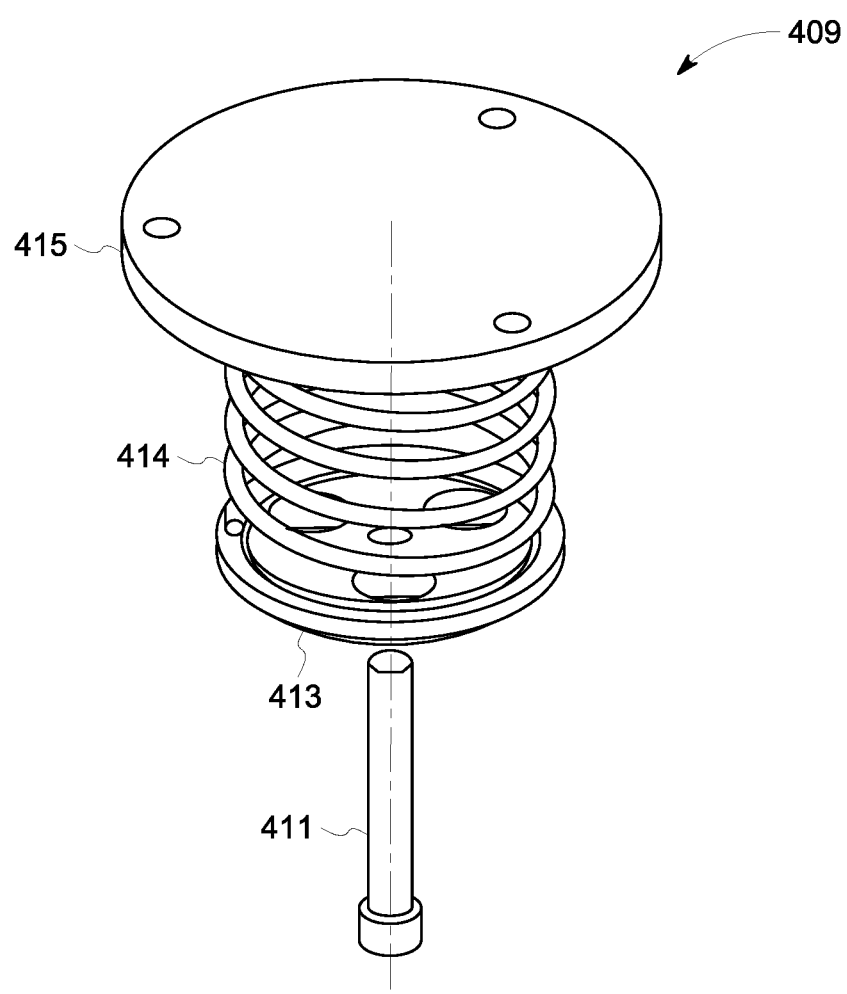
FIG. 7 is a disassembled view of the spring assembly of FIG. 6.

In FIG. 3, an alternative embodiment of a filtration system 301 is shown, having an oil reservoir 303 with one or more wheels 305, and a filter housing 307 with a handle 308 and configured to house the spring loaded filter and bag filter. As shown, system 301 further includes one or more inlets 309 and one or more outlets 311. In the preferred embodiment, a lid 313 can provide access to reservoir 303 and a second lid 315 can provide access to housing 307. A control system 317 is further included for the operation of system 301.

In FIGS. 4-7, a spring loaded filter 401 for use with the present invention is shown, filter 401 having a housing 403 configured to hold a filter basket 405 with a filter bag 407 contained therein. A spring assembly 409 secures over the filter and holds the filter and filter basket within the filter housing, the assembly 409 having a slide bolt 411 configured to be inserted into the filter bag and engage with a bottom plate 413. A compression spring 414 is positioned on top of the bottom plate 413 and configured to surround the slide bolt. A lid 415 is positioned on top of the compression spring 415 and is secured to the filter housing via one or more knobs 417 and one or more lid studs 418. In some embodiments, an O ring 419 is positioned under the lid for a tight seal.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A mobile oil filtration system, comprising:
a mobile oil reservoir having a plurality of wheels;
a housing secured to the mobile oil reservoir;
an input conduit secured to the housing;
a pump in fluid communication with the input conduit;
a spring-loaded filter downstream from and in fluid communication with the pump, the spring loaded filter having:
  a filter housing configured to hold a filter bag;
  a spring assembly configured to engage with the filter housing, the spring assembly having:
    a slide bolt configured to be inserted into the filter bag;
    a bottom plate configured to engage with the slide bolt opposite the filter bag;
    a compression spring configured to surround the slide bolt; and
    a lid positioned on top of the compression spring and secured in place via one or more knobs, thereby securing the filter housing and lid together with the filter, slide bolt, and compression spring inside;
a bag filter downstream from and in fluid communication with the spring-loaded filter; and
an output conduit secured to the housing and in fluid communication with the bag filter;
wherein the pump creates a pressure force against oil, which in turn drives the oil through the input conduit, through the spring-loaded filter, the bag filter, and through the output conduit; and
wherein the spring-loaded filter and the bag filter are configured to remove particulate matter from the oil.

* * * * *